United States Patent
Shi et al.

(10) Patent No.: US 8,555,400 B2
(45) Date of Patent: Oct. 8, 2013

(54) PRIVACY-PRESERVING AGGREGATION OF TIME-SERIES DATA

(75) Inventors: Runting Shi, San Jose, CA (US); Richard Chow, Sunnyvale, CA (US); Tsz Hong Hubert Chan, Hong Kong (HK)

(73) Assignee: Palo Alto Research Center Incorporated, Palo Alto, CA (US)

( * ) Notice: Subject to any disclaimer, the term of this patent is extended or adjusted under 35 U.S.C. 154(b) by 226 days.

(21) Appl. No.: 13/021,538

(22) Filed: Feb. 4, 2011

(65) Prior Publication Data

US 2012/0204026 A1 Aug. 9, 2012

(51) Int. Cl.
 *G06F 17/30* (2006.01)
 *H04L 9/00* (2006.01)
 *H04L 9/32* (2006.01)

(52) U.S. Cl.
 USPC ............ 726/26; 726/1; 726/2; 726/3; 726/22; 726/28; 726/29; 726/30; 380/44; 380/277; 380/278; 380/282; 713/161; 713/171

(58) Field of Classification Search
 USPC .............................. 726/26; 380/277; 713/171
 See application file for complete search history.

(56) References Cited

U.S. PATENT DOCUMENTS

| | | | |
|---|---|---|---|
| 2003/0140230 A1* | 7/2003 | de Jong et al. | 713/182 |
| 2009/0089789 A1* | 4/2009 | Faltings et al. | 718/104 |
| 2009/0254971 A1 | 10/2009 | Herz et al. | |
| 2010/0332583 A1* | 12/2010 | Szabo | 709/202 |
| 2011/0055221 A1* | 3/2011 | Sovio et al. | 707/747 |
| 2011/0258040 A1* | 10/2011 | Gnanasambandam | 705/14.45 |
| 2011/0283099 A1 | 11/2011 | Nath et al. | |
| 2012/0143922 A1* | 6/2012 | Rane et al. | 707/803 |

OTHER PUBLICATIONS

Rastogi, Jun. 6, 2010, Acm, pgs. 735-746.*
Benaloh, Josh et al., "Patient Controlled Encryption: Ensuring Privacy of Electronic Medical Records" In ACM Workshop on Cloud Computing Security, 2009, pp. 103-114.
Molina, A.D. et al. "HICCUPS: Health Information Collaborative Collection Using Privacy and Security in SPIMACS", 2009, pp. 21-30.
Vibhor Rastogi et al., "Differentially private aggregation of distributed time-series with transformation and encryption", Proceedings off the 2010 International Conference of Management of Data, Jun. 8, 2010, pp. 735-746.

(Continued)

*Primary Examiner* — Edan Orgad
*Assistant Examiner* — Jenise Jackson
(74) *Attorney, Agent, or Firm* — Shun Yao; Park, Vaughan, Fleming & Dowler LLP

(57) ABSTRACT

A private stream aggregation (PSA) system contributes a user's data to a data aggregator without compromising the user's privacy. The system can begin by determining a private key for a local user in a set of users, wherein the sum of the private keys associated with the set of users and the data aggregator is equal to zero. The system also selects a set of data values associated with the local user. Then, the system encrypts individual data values in the set based in part on the private key to produce a set of encrypted data values, thereby allowing the data aggregator to decrypt an aggregate value across the set of users without decrypting individual data values associated with the set of users, and without interacting with the set of users while decrypting the aggregate value. The system also sends the set of encrypted data values to the data aggregator.

18 Claims, 5 Drawing Sheets

(56) References Cited

OTHER PUBLICATIONS

Enar Mykletun et al "Public Key Based Cryptoschemes for Data Concealment in Wireless Sensor Networks", IEEE International Conference on Communications, Jun. 1, 2006, pp. 2288-2295.

Bista, R. et al., "A New Approach to Secure Aggregation of Private Data in Wireless Sensor Networks", 8th IEEE International Conference on Dependable, Autonomic and Secure Computing, Dec. 12, 2009, pp. 394-399.

* cited by examiner

PRIVACY-PRESERVING AGGREGATION OF TIME-SERIES DATA

BACKGROUND

1. Field

This disclosure is generally related to data encryption. More specifically, this disclosure is related to a method and apparatus for gathering statistical data from a set of participants without compromising their privacy.

2. Related Art

Many data-processing applications require a data aggregator to gather and process data from a collection of different sources. For example, a research institution conducting studies on weather patterns may wish to deploy specialized sensors at a variety of key locations. However, if the land for some of these key locations is owned by corporations such as manufacturing plants, it is unlikely that these corporations would want information to be gathered from their land in case this information proves to be damaging. Moreover, even if the data aggregator promises to delete the raw information after determining the aggregate statistics across all participating sites, it is likely that some of these participating sites will not trust the aggregator with the raw data at all.

Similarly for other applications, the set of participants can include organizations or individuals that may not trust the data aggregator with their personal information. This poses a significant problem for research and business applications that stand to benefit from statistical data culled from a large sample of participants. Therefore, these data-processing applications face the challenge of gathering statistical data from a multitude of participants while still protecting the privacy of these participants.

SUMMARY

One embodiment provides a system that contributes a user's data to a data aggregator without compromising the user's privacy. The system can begin by determining a private key for a local user in a set of users, wherein the sum of the private keys associated with the set of users and the data aggregator is equal to zero. The system also selects a set of data values associated with the local user. Then, the system encrypts individual data values in the set based in part on the private key to produce a set of encrypted data values, thereby allowing the data aggregator to decrypt an aggregate value across the set of users without decrypting individual data values associated with the set of users, and without interacting with the set of users while decrypting the aggregate value. The system also sends the set of encrypted data values to the data aggregator.

In some embodiments, the system determines the private key for the local user by receiving the private key from a trusted source.

In some embodiments, the system determines the private key for the local user by using a secure multi-party protocol.

In some embodiments, the set of data values includes a time series of data values. Moreover, the system may determine the private key prior to encrypting the individual data values in the time series.

In some embodiments, the aggregate value includes a summation of the individual values associated with the set of users. Moreover, the system encrypts an individual data value $x_{i,t}$ for a user i and time period t by computing the expression:

$$c_{i,t} = g^{x_{i,t}} \cdot H(t)^{sk_i},$$

such that $c_{i,t}$ is an encrypted value associated with user i and time period t, wherein g is a generator, wherein $sk_i$ is a private key associated with user i, and wherein $H(t)$ is a hash function.

In some embodiments, the aggregate value includes a product of the individual values associated with the set of users, and encrypting an individual data value $x_{i,t}$ for a user i and time period t involves computing the expression:

$$c_{i,t} = x_{i,t} \cdot H(t)^{sk_i},$$

such that $c_{i,t}$ is the encrypted value associated with user i and time period t, wherein $sk_i$ is a private key associated with user i, and wherein $H(t)$ is a hash function.

In some embodiments, encrypting the individual data values involves adding random values to at least a subset of the data values to produce a modified set of data values with random noise.

In some embodiments, the random values are chosen from a carefully selected distribution to minimize the total noise introduced to the aggregate value by the set of users to:

$$O\left(\frac{\Delta}{\varepsilon}\sqrt{n}\right),$$

wherein $\Delta$ is the sensitivity of the aggregate value, and n is the number of users.

In some embodiments, encrypting the individual data values involves also encrypting higher moments of the individual data values, thereby allowing the data aggregator to determine a distribution for the data values across the set of users.

Another embodiment provides a system that computes an aggregate value for a set of data values associated with a set of users. The system can begin by determining a private key for a data aggregator, wherein the sum of the private keys associated with a set of users and the data aggregator is equal to zero. The system also receives a set of encrypted data values from the corresponding set of users. The system then uses the private key to determine an aggregate value across the set of users without decrypting individual data values associated with the set of users, and provides the aggregate value to the data aggregator.

In some embodiments, the system determines the aggregate value by computing the expression:

$$V = H(t)^{sk_0} \prod_{i=1}^{n} c_{i,t},$$

such that $c_{i,t}$ is an encrypted value associated with a user i and time period t, wherein n is a number of users in the set of users, wherein $sk_0$ is the private key associated with the data aggregator, and wherein $H(t)$ is a hash function.

In some embodiments, the aggregate value includes a summation of the individual data values associated with the set of users, and the system determines the aggregate value by computing a discrete log of V.

In some embodiments, the aggregate value includes a product of the individual data values associated with the set of users.

Figure 1:
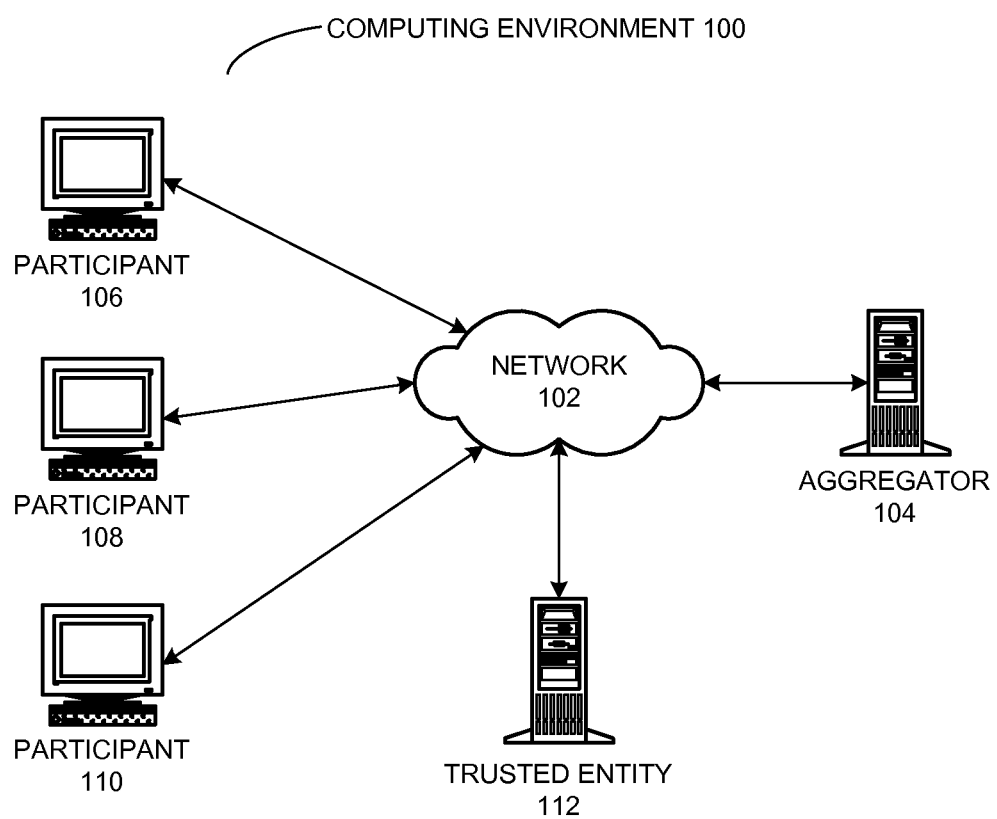
FIG. 1 illustrates an exemplary computing environment for private stream aggregation in accordance with an embodiment.

TABLE 1 presents an algorithm for performing distributed-differential-privacy data randomization in accordance with an embodiment.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a Private Stream Aggregation (PSA) system which allows users to upload a stream of encrypted data to an untrusted aggregator, and allows the aggregator to use a private key to decrypt aggregate statistics for each time interval. The PSA technique guarantees a strong notion of privacy. First, the PSA technique is aggregator oblivious, meaning that the aggregator is unable to learn any unintended information other than what it can deduce from the desired statistics and its auxiliary knowledge. Second, the PSA technique guarantees distributed differential privacy for the individual participants, such that the statistic revealed to the aggregator is not affected much by whether or not a specific individual participates. Therefore, the distributed differential privacy guarantee provides participants with an assurance that they can safely contribute their encrypted data without resulting in an increased risk of privacy breach.

Formulation of a Privacy Model

Embodiments of the present invention provide a privacy model which is stronger than typical differential privacy techniques. Specifically, this privacy model is stronger in the sense that the data aggregator does not need to be a trusted entity. With a typical differential privacy technique, the data aggregator is assumed to be a trusted entity that wishes to publish statistics about a population, such that the trusted data aggregator is entitled to see all participants' data. In contrast, embodiments of the present invention ensure that the data aggregator is able to learn only the intended statistics, and is not exposed to additional information about the participants. Furthermore, the statistics revealed to the data aggregator satisfies differential privacy guarantees. Thus, embodiments of the present invention protect each individual participant's privacy even when the aggregator has arbitrary auxiliary information about an individual's data (but has not compromised the participant's private key), or when the aggregator colludes with a subset of corrupted participants.

Computing Aggregate Data Statistics for Time-Series Data

In some embodiments of the present invention, an untrusted data aggregator can compute an aggregate statistic (e.g., a sum or a product of the participants' data) for time-series data without having access to the individual data points. For example, a data aggregator may desire to keep track of the total sales revenue of n companies every week. The privacy model provided by embodiments of the present invention allows each individual company to upload a noisy encryption of their revenue every week to the data aggregator. Moreover, the data aggregator can decrypt the noisy sum of the participating companies' revenues, but is not able to obtain the weekly revenue data associated with an individual company. Thus, the data aggregator is unable to infer additional information that is specific to an individual company.

Exemplary System

FIG. 1 illustrates an exemplary computing environment for private stream aggregation in accordance with an embodiment. Specifically, computing environment 100 can include a computer network 102, a data aggregator 104, and participants 106, 108, and 110. In some embodiments, computing environment 100 can also include a trusted entity 112 which performs a trusted setup for computing environment 100. Aggregator 104, participants 106-110, and trusted entity 110 can include computing devices coupled to computer network 102, such as a server computer, a desktop, a laptop, a portable computing device, or a wireless sensor. Moreover, computer network 102 can include a wired network, a wireless network, or a combination of thereof.

During operation, computing system 100 undergoes at least three key operations: setup, noisy encrypt, and aggregate decrypt. During an initial setup operation, trusted entity 112 can assign a private key to each of participants 106-110, and assign a private key to aggregator 104 which provides aggregator 104 with a decode capability. Specifically, the sum of the values for the private keys associated with aggregator 104 and participants 106-110 is equal to zero. This feature allows participants 106-110 to encrypt their data such that only the aggregator's private key can decrypt the aggregate value (e.g., decrypt a sum of the data values received from the individual participants).

In some embodiments, aggregator 104 and participants 106-110 can perform the initial setup operation using a secure multi-party protocol, thereby not requiring the assistance of trusted entity 112. For example, aggregator 104 and participants 106-110 can negotiate with each other to determine a set of private keys whose sum is equal to zero, without having to reveal their private keys.

During the noisy encrypt operation, a participant (e.g., participant 106) can encrypt a data value using its private key. In some embodiments, the participant can add noise to the data value before encrypting the data value. For example, as the participant encrypts a set of data time-series data values over a period of time, a subset of the encrypted data values can include random noise while the remaining subset of the encrypted data values does not include random noise.

Moreover, during the aggregate decrypt operation, aggregator 104 determines an aggregate value based in part on its private key, and on a set of encrypted values which aggregator 104 has received from participants 106-110. Note that because aggregator 104 does not know the private keys for any of participants 106-110, aggregator 104 is not able to decrypt an individual data value obtained from any of participants 106-110. However, the private stream aggregation technique provided by embodiments of the present invention allows aggregator 104 to use its private key to determine an aggregate value for the set of encrypted data values.

The following paragraphs provide a variety of exemplary applications for the private stream aggregation system associated with computing environment 100. In each exemplary application, the private stream aggregation technique allows participants (e.g., individual users or organizations) to contribute their individual data to a data aggregator without having to reveal their individual data values to the data aggregator.

Sensor Network Aggregation:

Sensor networks are commonly deployed for a variety of applications, such as to monitor the safety of buildings, measure traffic flows, or track environmental pollutants. In a typical application, deployed sensor nodes periodically send their readings to a central station, which mines the data to identify a pattern or determine a statistic. In many situations, the readings made by the individual sensors may be privacy sensitive, especially if the sensors are deployed across multiple participating organizations. The private stream aggregation technique provided by embodiments of the present invention provide these participating companies with a privacy guarantee that a central station (e.g., aggregator 104) will not obtain detailed information from any specific sensor node (e.g., participants 106-110). Thus this privacy guarantee can encourage a participating company to contribute to important research projects by deploying sensor nodes across its organization.

Smart Metering:

Another example is the advent of the electrical "smart grid" and "smart metering" technologies. Smart meters read utility usage at a much finer granularity than traditional meters, such as by reading utility usage every 15 minutes as opposed to once per month. This fine-grained sampling of utilities can provide a utility company with enough detailed information to deduce sensitive information. For example, the utility company may be able to deduce the number of individuals in the household and their sleep/work habits, as well as their usage of specific household appliances. The private stream aggregation technique provided by embodiments of the present invention can provide a utility company (e.g., aggregator 104 in FIG. 1) with the ability to obtain a fine-grained sampling of utility usage across a set of households (e.g., participants 106-110) without revealing the actual fine-grained utility usage from any particular household. This can alleviate concerns and reservations that households may have toward smart grid technologies, and the aggregate statistics would still be enough for smart grid operators to achieve their monitoring efforts and price optimizations.

Public Health and Clinical Research:

Medical research benefits greatly from medical data, but privacy concerns restrict the extent to which this data is collected and disseminated. The private stream aggregation technique provided by embodiments of the present invention can enable researchers to obtain high-level statistics that span a group of individuals or organizations, and only those high-level statistics, from data uploaded continually by the caregivers or telemetry devices.

Population Monitoring and Sensing:

Many research projects or software technologies perform a degree of population polling, sensing, and monitoring, which can spur privacy concerns across individuals. For example, certain corporate software can use a participant's data obtained from cameras, wifi, and computer activity to estimate the participant's availability, and help co-workers identify the best means for communication with that participant at a given point in time. However, detailed information about the participant's work habits can be deduced from this availability information. Therefore, some users may be reluctant to participate in fear that this information on their availability can be misused by company managers. The private stream aggregation technique provided by embodiments of the present invention can enable a corporation to obtain statistical information across a group of participants, while allowing a participant to only share detailed availability information with selected individuals.

Cloud Services:

As cloud computing gains popularity, individuals and organizations are storing an increasing amount of data on third-party cloud services. Cloud service providers wish to compute useful statistics over this data, to realize various social and economic goals. However, participating companies cite concerns about the security and privacy of their data as a top reason for not making more use of cloud services. The private stream aggregation technique provided by embodiments of the present invention can enable a cloud service provider to track certain aggregate statistics from multiple participants over time, without obtaining sensitive information from individual participants.

Figure 2:
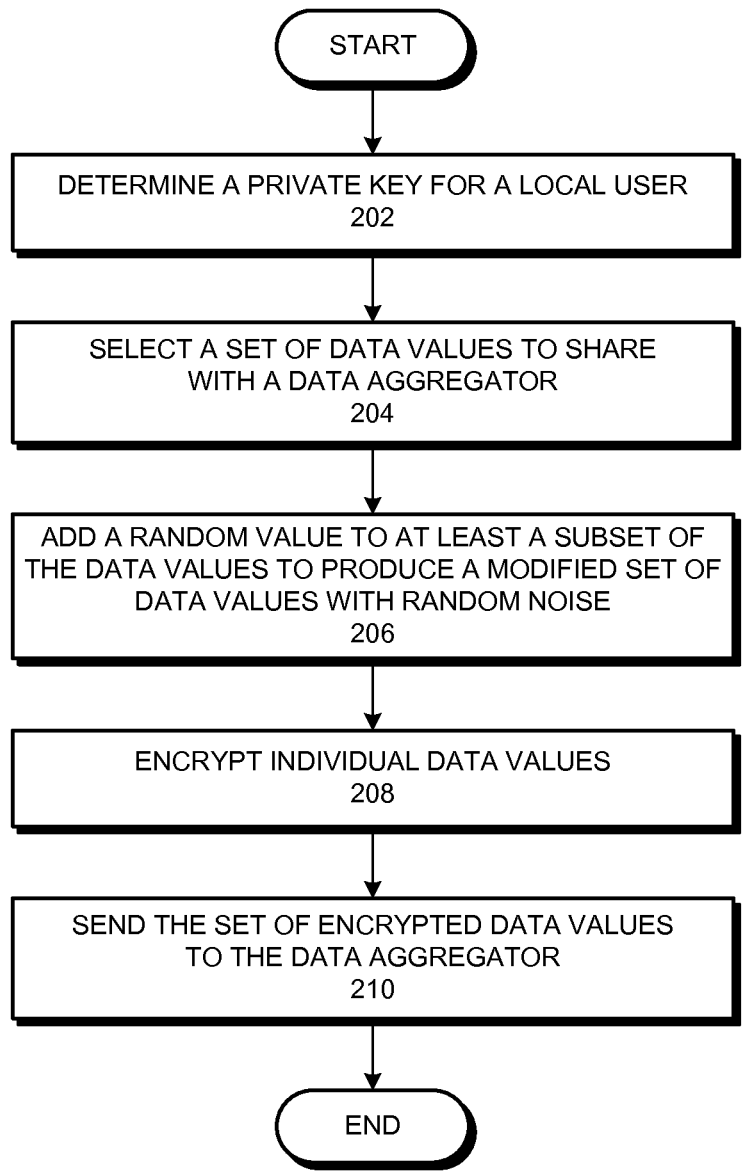
FIG. 2 presents a flow chart illustrating a process for securely sharing data with an untrusted data aggregator in accordance with an embodiment.

FIG. 2 presents a flow chart illustrating a process for securely sharing data with an untrusted data aggregator in accordance with an embodiment of the present invention. The process can be performed on a computer system comprising a storage device that stores instructions that implement the process, and a processing unit that executes the stored instructions.

The system can begin by determining a private key for a local participant in a set of participants (operation 202), such that the sum of the private keys associated with the set of participants and the data aggregator is equal to zero. For example, operation 202 can involve receiving the private key from a trusted source, or using a secure multi-party protocol to determine the private keys for the data aggregator and the set of participants.

Next, the system can select a set of data values to share with the data aggregator (operator 204), and can add a random value to at least a subset of the data values to produce a modified set of data values with random noise (operation 206, optional). Note that the data values can include a time-series. The system then encrypts individual data values in the set (operation 208), and sends the encrypted data values to the data aggregator (operation 210).

In some embodiments, the aggregate value can include a summation of the individual values associated with the set of participants for a particular time period. In this case, encrypting an individual data value $x_{i,t}$ for a participant i and time period t involves computing the expression:

$$c_{i,t} = g^{x_{i,t}} \cdot H(t)^{sk_i}.$$

Specifically, $c_{i,t}$ is an encrypted value associated with participant i and time period t, g is a generator, $sk_i$ is a private key associated with participant i, and $H(t)$ is a hash function.

In some embodiments, the aggregate value includes a product of the individual values associated with the set of participants. In this case, encrypting an individual data value $x_{i,t}$ for a participant i and time period t involves computing the expression:

$$c_{i,t} = x_{i,t} \cdot H(t)^{sk_i}.$$

Figure 3:
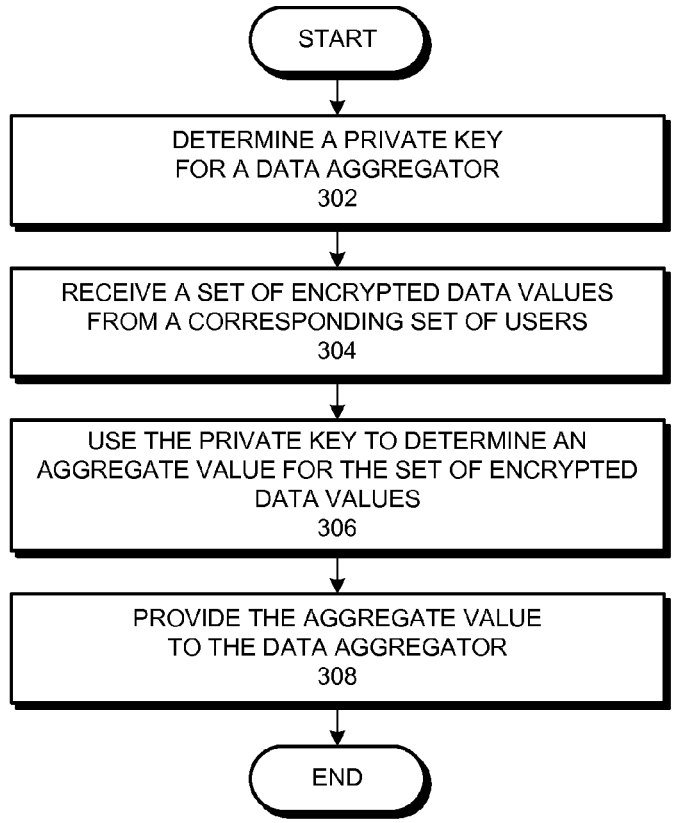
FIG. 3 presents a flow chart illustrating a process performed by a data aggregator for determining an aggregate value from encrypted data provided by a set of participants in accordance with an embodiment.

FIG. 3 presents a flow chart illustrating a process performed by a data aggregator for determining an aggregate value from encrypted data provided by a set of participants in accordance with an embodiment of the present invention.

The system can begin by determining a private key for the data aggregator (operation 302), such that the sum of the private keys associated with the set of participants and the data aggregator is equal to zero. For example, operation 302 can involve receiving the private key from a trusted source, or can involve using a secure multi-party protocol to determine the private keys for the data aggregator and the set of participants.

Next, the system can receive a set of encrypted data values from the corresponding set of participants (operation 304). The system uses the private key associated with the data aggregator to determine an aggregate value for the set of encrypted data values (operation 306). The system then provides the aggregate value to the data aggregator (operation 308).

In some embodiments, determining the aggregate value involves computing the expression:

$$V = H(t)^{sk_0} \prod_{i=1}^{n} c_{i,t}.$$

Specifically, $c_{i,t}$ is an encrypted value associated with a participant i and time period t, n is the total number of participants, $sk_0$ is the private key associated with the data aggregator, and $H(t)$ is a hash function.

In some embodiments, the aggregate value includes a summation of the individual data values associated with the set of participants, such that determining the aggregate value further involves computing a discrete log of V. In some embodiments, the aggregate value includes a product of the individual data values associated with the set of participants.

DEFINITIONS AND NOTATIONS

In a generalized application, there may be one data aggregator and n participants. For notational convenience, the participants are numbered 1, . . . , n, and the data aggregator is numbered 0. For example, a private key $sk_{i\neq 0}$ is associated with a participant, and a private key $sk_0$ is associated with the data aggregator. Moreover, let $[n]:=\{1, 2, \ldots, n\}$, and let D represent a certain domain of allowable values for a participant's data. Thus, for a time period t∈N, data associated with a participant i∈[n] has a value $x_{i,t} \in D$.

For simplicity, the notation for a participant's data value may not always include the subscript t, and it can be assumed that a set of data values $x_i$ for i∈[n] correspond to a common time period. Thus, let $x=(x_1, \ldots, x_n) \in D^n$ denote the vector of values from all participants in some time period. Moreover, an aggregator uses a function $f(x)$ to compute a desired statistical value belonging to a range O. Thus, the aggregator computes aggregate statistics represented by the function $f:D^n \to O$.

In some embodiments, each participant can generate independent random noise to achieve strong privacy guarantees even when the aggregator may have arbitrary auxiliary information about users' inputs. Specifically, each participant can generate random noise $r_i$ independent of other participants, such that noise $r_i$ from some sample space $\Omega$ is represented by $r:=(r_1, \ldots, r_n) \in \Omega^n$. For notation purposes, a hatted variable denotes a randomized versions of a participants' data (e.g., associated with some random value r and a randomization function $\chi$), and a non-hatted variable denotes original participant data. Thus, let $\chi:D \times \Omega \to D$ denote a randomization function which can be used by participants to compute a noisy version of data $\hat{x}_i := \chi(x_i, r_i)$ before encrypting and uploading the value to the aggregator. The aggregator then computes a noisy statistic $f(\hat{x})$ from the encrypted values of $\hat{x} := (\hat{x}_1, \hat{x}_2, \ldots, \hat{x}_n)$, such that the noise introduced into the desired statistic $f(x)$ is within a predetermined level.

In some embodiments, a participant i can generate noise $r_i$ according to a desired data distribution which is custom to that participant. Moreover, each participant i can apply a different randomization function $\chi_i(x_i, r_i)$ to data $x_i$. In an even more general scenario, each participant may encrypt data $x_i$ and randomness $r_i$ separately before sending $x_i$ and $r_i$ to the aggregator, who can compute a randomized aggregate function $f:D^n \times \Omega^n \to O$ on the encrypted inputs. However, for simplicity, the following paragraphs consider the special case when $f(x,r)=f(\hat{x})$. Furthermore, the following paragraphs cover a scenario where the participants apply the same randomization function $\chi$ before encrypting data.

The private stream aggregation (PSA) mechanism provided by embodiments of the present invention consists of several key functions: Setup( ), NoisyEnc( ) and AggrDec( ).

Setup($1^\lambda$):

The setup( ) function takes in a security parameter $\lambda$, and outputs public parameters param, a private key $sk_i$ for each participant, as well as a private key for the aggregator $sk_0$ which is used by the aggregator to decrypt aggregate statistics in each time period. Each participant i obtains the private key $sk_i$, and the data aggregator obtains the capability $sk_0$. After the trusted setup phase, no further interaction is required between the participants and the data aggregator except for uploading the encrypted data values to the data aggregator.

NoisyEnc(param,$sk_i$,t,x,r):

During a time step t, each participant calls the NoisyEnc function to encode its data x with noise r. The result is a noisy encryption of data point x randomized with noise r. The NoisyEnc function is sometimes written as NoisyEnc(param, $sk_i$,t,$\hat{x}$), where $\hat{x}:=\chi(x,r)$ is the noisy version of the participant's data, and $\chi$ is an underlying randomization function.

AggrDec(param,$sk_0$,t,$c_1,c_2, \ldots, c_n$):

The decryption algorithm takes in the public parameters param, a capability $sk_0$, and ciphertexts $c_1,c_2, \ldots, c_n$ for the same time period t. For each i∈[n], let $c_i$=NoisyEnc($sk_i$,t,$\hat{x}_i$), where each $\hat{x}_i:=\chi(x_i,r_i)$. Let $x:=(x_1, \ldots, x_n)$ and $\hat{x}:=(\hat{x}_1, \ldots, \hat{x}_n)$. The decryption algorithm outputs $f(\hat{x})$, which is a noisy version of the targeted statistics $f(x)$.

In some embodiments, the aggregating function $f(\hat{x})$ produces a noisy summation of data values for the set of participants. In this context, a participant's data $x_i$ belongs to $Z_p$ for some prime p, and the aggregating function is defined as $$\text{sum}(\hat{x}) := \sum_{i=1}^{n} \hat{x}_i.$$

Moreover, each participant can generate noise $r_i$ from the set of integers and apply the randomization function $\chi(x_i,r_i):=x_i+r_i \mod p$ (i.e., a participant incorporates additive noise before encrypting data).

Similarly, in some other embodiments, the aggregating function $f(\hat{x})$ produces a noisy product of data values for the set of participants. In this context, the aggregating function is defined as $$\text{product}(\hat{x}) := \prod_{i=1}^{n} \hat{x}_i.$$

Figure 4:
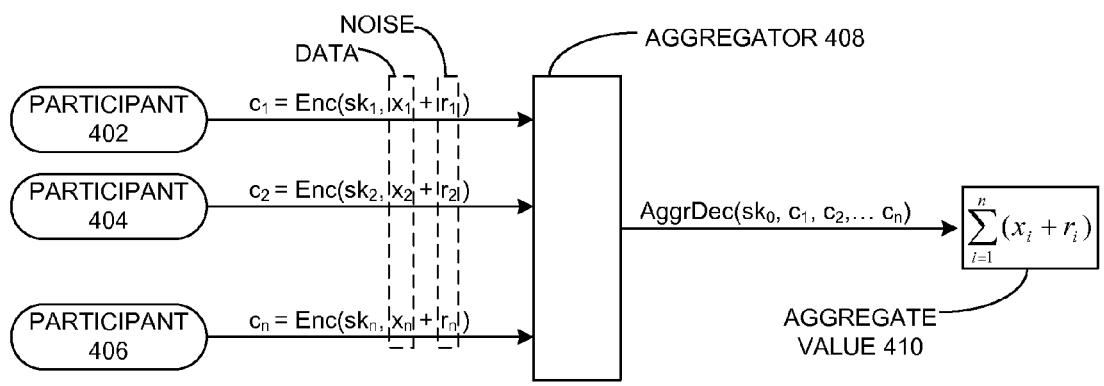
FIG. 4 presents a diagram illustrating an exemplary flow of information between a set of participants and a data aggregator in accordance with an embodiment.

FIG. 4 presents a diagram illustrating an exemplary flow of information between a set of participants and a data aggregator in accordance with an embodiment of the present invention. Specifically, participants 402-406 can produce a corresponding set of encrypted data values, such that a participant can add noise $r_i$ to data value $x_i$ before using a private key $sk_i$ to produce a corresponding encrypted data value $c_i$. Moreover, aggregator 408 receives the encrypted data values form participants 402-406, and uses its private key $sk_0$ to produce an aggregate value 410.

Achieving Aggregator Obliviousness

The aggregator obliviousness requirement provides a guarantee that an aggregator learns nothing other than what can be inferred from the revealed statistics $f(\hat{x})$ and any auxiliary data that it already knows. In addition, achieving this requirement guarantees that a party without an appropriate aggregator capability (e.g., the aggregator's private key $sk_0$) learns nothing.

Intuitively, the aggregator obliviousness requirement satisfies the following security notions:

The aggregator can learn only the noisy sum for each time period, and nothing more. For example, the aggregator cannot learn any partial information from a proper subset of all participants' ciphertexts.

Without knowing the aggregator's private key, an adversary does not learn anything about the encrypted data, even if several participants form a coalition against the remaining users.

If the aggregator colludes with a subset of the participants, or if a subset of the encrypted data has been leaked, then the aggregator can inevitably learn the sum of the remaining participants. However, the aggregator cannot learn the individual data values for the remaining participants.

The notion of aggregator oblivious security may be extended to general statistics other than sum. However, extra care must be taken to limit the information that an adversary can obtain from a successful attack. For example, if an adversary has compromised the set $K \subseteq [n]$ of participants, the adversary is then able to encrypt anything on behalf of these participants. Therefore, the adversary can plug in any desired plaintext vector $\hat{x}_K = \{\hat{x}_i | i \in K\}$ for the set of compromised participants K, encrypt the plaintext vector, and then call the AggrDec function to decrypt the aggregate statistics based on $\hat{x}_K$. Thus, the security definition should reflect the fact that this is the best and only strategy for an adversary (i.e., the adversary is unable to learn extra information other than information gleaned from this attack). This requirement is defined by the following paragraph.

Definition 1 (Aggregator Oblivious Security):

A PSA is aggregator oblivious, if there is no probabilistic polynomial-time adversary which has more than a negligible advantage in distinguishing which plaintext vector (i.e., x or x') has been encrypted by a challenger. This requirement is typically satisfied when the two plaintext vectors are equivalent with respect to their aggregate values. For the sum statistic, this requirement is defined as follows:

$$\sum_{i \in U} x_i = \sum_{i \in U} \hat{x}'_i.$$

This condition can be more difficult to satisfy for general queries associated with other statistics.

Definition 2 (Encrypt-Once Security):

Each honest participant is expected to encrypt only once per time period. A PSA is said to be aggregator oblivious in the "encrypt-once" model if:
1) There is no probabilistic polynomial-time adversary which has more than a negligible advantage in the above security game; and
2) The following constraint holds: $\forall i \in U$, $\forall (x,r) \in \mathcal{D} \times \Omega$, where the tuple $(i, t^*, x, r)$ does not appear in any Encrypt query.

The following paragraphs describe a cryptographic construction for achieving aggregator oblivious security. Let G denote a cyclic group of prime order p for which Decisional Diffie-Hellman is hard. Moreover, let $H: Z \rightarrow G$ denote a hash function (modeled as a random oracle) that maps an integer to the mathematical group G.

Setup($1^\lambda$):

During a trusted setup phase, a trusted dealer chooses a random generator $g \in G$, and n+1 random secrets $sk_i \in Z_p$, such that $$\sum_{i=0}^{n} sk_i = 0.$$

Note that the public parameters is initialized as param:=g. Moreover, the data aggregator obtains the capability $sk_0$, and participant i obtains the private key $sk_i$.

Thus, during a time period t, each participant computes $R_{i,t} = H(t)^{sk_i}$ for $i \in [n]$, and the aggregator computes $R_{0,t} = H(t)^{sk_0}$. Note that because the sum for $sk_i$ is equal to zero, it follows that $$\prod_{i=0}^{n} R_{i,t} = 1.$$

This property allows the NoisyEnc( ) and AggrDec( ) operations to function independently, without requiring the participants to communicate with each other after the trusted setup phase. Moreover, given that Decisional Diffie-Hellman is hard for the cyclic group G, it follows that the numbers $R_{i,t}$ are seemingly random under the random oracle model.

NoisyEnc(param, $sk_i$, t, $\hat{x}$):

For participant i to encrypt a value $\hat{x} \in Z_p$ for time step t, the participant computes the following ciphertext:

$c \leftarrow g^{\hat{x}} \cdot H(t)^{sk_i}$

Given that each participant is assumed to add noise to data values before encrypting the data value, a randomized plaintext value is represented by the term $\hat{x} = x + r \mod p$.

AggrDec(param, $sk_0$, t, $c_1, c_2, \ldots, c_n$):

An aggregator computes an aggregate value V as follows:

$$V = H(t)^{sk_0} \prod_{i=1}^{n} c_i.$$

In doing so, note that $c_i = \text{NoisyEnc}(\text{param}, sk_0, t, \hat{x}_i)$ for $i \in [n]$. Moreover, since $sk_i$ for the aggregator and the set of participants add up to zero, $$\prod_{i=0}^{n} H(t)^{sk_i} = 1.$$

It therefore follows that V is of the form:

$$V = g^{\sum_{i=1}^{n} \hat{x}_i}.$$

To decrypt the sum $$\sum_{i=1}^{n} \hat{x}_i,$$

the aggregator computes the discrete log of V base g. When the plaintext space is small, decryption can be achieved through a brute-force search. A better approach is to use Pollard's lambda method, which requires decryption time roughly square root in the plaintext space. For example, suppose each participant's input is in the range $\{0, 1, \ldots, \Delta\}$. Then the sum of the participants fall within the range $\{0, 1, \ldots, n\Delta\}$. In this case, decryption would require $\sqrt{n\Delta}$ time using Pollard's method. In other words, it is required that $n\Delta$ is polynomial in the security parameter $\lambda$ to ensure successful decryption in polynomial time. Note that the limitation of small plaintext space is typical of Diffie-Hellman-based encryption schemes when used as additively homomorphic encryption schemes (e.g, El Gamal encryption and BGN homomorphic encryption).

Theorem 1:

Assuming that the Decisional Diffie-Hellman problem is hard in the group G and that the hash function H is a random oracle, then the construction provided in the above paragraphs satisfies aggregator oblivious security in the "encrypt-once" model.

Practical Performance for Achieving Aggregator Obviousness

In the proposed cryptographic construction, encryption involves at least a hash operation (e.g., SHA-256), two modular exponentiations and one multiplication in a Diffie-Hellman group. The running time is dominated by the two modular exponentiations, as the time for computing the hash function and group multiplication are much smaller in comparison with the time for an exponentiation. According to benchmarking numbers reported by the eBACS project, on a modern 64-bit desktop computes, it takes roughly 3 ms to compute a modular exponentiation using a classic Diffie-Hellman group modular a 1024-bit prime. Using high-speed elliptic curves such as "curve25519," it takes only 0.3 ms to compute a modular exponentiation. Therefore, encryption can be done in roughly 0.6 ms on a modern computer. Decryption of the aggregate statistics requires taking a discrete log, and if one uses the brute-force method, it takes one modular exponentiation, which requires 0.3 ms to try each possible plaintext. Therefore, the PSA technique provided by embodiments of the present invention is practical in situations where the plaintext space is small. For example, when each participant's plaintext includes one bit indicating her availability for communication, and when there are roughly 1000 participants, decryption can be done in about 0.3 s using the brute-force approach. Adopting Pollard's lambda method for decryption can provide further speed-up, thus reducing the run time to about $\sqrt{n\Delta}$, where n is the number of participants, and assuming each participant's value is in the set $\{0, 1, \ldots, \Delta\}$.

Definition for Distributed Differential Privacy

Embodiments of the present invention guarantee that the aggregator learns only the noisy statistic, but not each individual's values. Thus, the privacy for the individual participants is guaranteed for as long as the final statistic $f(\hat{x})$ has accumulated sufficient randomness. This allows each individual to add less random noise to the individual data values. Moreover, when a certain fraction of participants are compromised and decide to collude with the data aggregator, they may reveal their data or randomness to the aggregator. In this case, it is desirable that the remaining uncompromised participants' randomness is sufficient to protect their privacy.

This notion of privacy is referred to as Distributed Differential Privacy (DD-Privacy), which reflects the fact that the noise in the released statistic is collected from the participants. The following paragraphs define the notion of distributed differential privacy.

Recall that the aggregator evaluates a function $\theta: D^n \to O$ on randomized data $\hat{x} \in D^n$ of n participants, which are generated in the following way. Each participant, i, generates independent randomness $r_i \in \Omega$ according to some distribution, and applies a randomization function $\chi: D \times \Omega \to D$ on data $x_i$ to produce $x_i := \chi(x_i, r_i)$. Given $x \in D^n$ and $r \in \Omega^n$, the notation $\hat{x} = \hat{x}(r) := (\chi(x_1, r_1), \chi(x_2, r_2), \ldots, \chi(x_n, r_n))$ depicts how the dependence of $\hat{x}$ on r is implicit. Moreover, given a subset K of participants, let $r_K := \{r_i : i \in K\}$ and $\overline{K}$ be the complement of K (i.e., $\overline{K} = \{1, 2, \ldots, n\} \setminus K$).

The following distributed differential privacy requirement applies to each time period $t \in N$.

Definition 3 (($\epsilon, \delta$)-DD-Privacy):

Suppose $\epsilon > 0$, $0 \le \delta < 1$ and $0 < \gamma \le 1$. The data randomization procedure (i.e., given by the joint distribution $r := (r_1, \ldots, r_n)$ and the randomization function $\chi$) achieves ($\epsilon, \delta$)-distributed differential privacy (DD-privacy) with respect to the function $f$ and under $\gamma$ fraction of uncompromised participants if the following condition holds. For any neighboring vectors $x, y \in D^n$, for any subset $S \subset O$, and for any subset $\overline{K}$ of uncompromised participants of size at least $\gamma n$:

$$Pr[f(\hat{x}) \in S | r_K] \le \exp(\epsilon) \cdot Pr[f(\hat{y}) \in S | r_K] + \delta.$$

In Definition 3, two vectors $x, y \in D^n$ are said to be neighbors or neighboring vectors if they differ in exactly one coordinate. This corresponds to the scenario when exactly one user changes a data value.

When K is the set of compromised nodes, the above definition requires that the remaining honest participants' randomness be sufficient to ensure differential privacy. Therefore, the probability is conditioned on the randomness $r_K$ from compromised participants. In other words, the probability is taken over the randomness $r_{\overline{K}}$ from honest participants. The definition of DD-privacy requires that the equation under Definition 3 holds, for any set $\overline{K}$ of uncompromised participants, as long as $|\overline{K}| \ge \gamma n$.

Achieving Distributed Differential Privacy

The following paragraphs show how to build a cryptographic construction which achieves a ($\epsilon, \delta$)-differential privacy guarantee. This cryptographic technique lets participants be responsible for ensuring the differential privacy of their own data by adding noise to a data value before encrypting it. To achieve a distributed-differential privacy guarantee, the following two challenges need to be addressed:

Compromised Participants:

To ensure the differential privacy for participating individuals, the revealed statistic must contain random noise r of an appropriate magnitude. In real-world settings, participants may not trust each other, and it is possible that a subset of the participants may be compromised and collude with the data aggregator. In the worst case, if every participant believes that the other n−1 participants may be compromised and collude with the aggregator, a participant would need to add sufficient noise to ensure the privacy of its own data. This, however, would result in the aggregator computing a resulting statistic that accumulates an error beyond a desired value.

If at least γ fraction of the participants are honest and not compromised, then the noise generation task can be distributed among these participants. Each participant may add less noise, and as long as the noise in the final statistic is large enough, individual privacy is protected. Thus, it is assumed that the participants have an a priori estimate on the lower bound for γ. However, they don't need to know exactly which participants are compromised. Each participant is supposed to generate noise from a distribution that depends on γ. Honest participants will follow this protocol, but the compromised participants may reveal their noise to the data aggregator or choose not to add noise. This construction guarantees that, with a high probability, the revealed statistic will accumulate sufficient noise from the honest participants, while keeping the error of the final statistic within acceptable levels.

Algebraic Constraints:

Another challenge involves working within the algebraic constraints associated with the cryptographic construction. Typical encryption schemes require the plaintext value to be picked from a group of discrete values. Therefore, the cryptographic construction should be able to encode the data and noise values within a discrete group. Moreover, the cryptographic construction technique that achieves aggregator obliviousness should operate on a small plaintext space. Therefore, it is possible to work with such discrete groups by using a symmetric geometric distribution, instead of using the more commonly used Laplace distribution.

Embodiments of the present invention use a symmetric geometric distribution to work with a group of discrete data values. Note that the symmetric geometric distribution is unbounded, so it may overflow the size of the group, or the size of the plaintext space. Thus, embodiments of the present invention ensure that the probability of such an overflow is small enough to allow the aggregator to successfully decrypt noisy statistics with a high probability of success.

Definition 4 (Geometric Distribution):

Let $\alpha > 1$, and let Geom($\alpha$) denote the symmetric geometric distribution that takes integer values such that the probability mass function at k is $$\frac{\alpha - 1}{\alpha + 1} \cdot \alpha^{-|k|}.$$

Moreover, let Geom$^+$($\alpha$) denote a one-sided geometric distribution that takes positive integer values such that the probability mass function at k is $(\alpha - 1)\alpha^{-k}$.

The symmetric geometric distribution Geom($\alpha$) can be viewed as a discrete version of the Laplace distribution Lap(b) (where $$\text{(where } \alpha \approx \exp\left(\frac{1}{b}\right)\text{)},$$

whose probability density function is $$x \mapsto \frac{1}{2b}\exp\left(-\frac{|x|}{b}\right).$$

The following property of Geom distribution is useful for designing differentially private mechanisms that output integer values.

Property 1:

Let $\epsilon > 0$, and suppose u and v are two integers such that $|u-v| \leq \Delta$. Moreover, let r be a random variable having distribution $$Geom\left(\exp\left(\frac{\epsilon}{\Delta}\right)\right).$$

Then, for any integer k, $\Pr[u+r=k] \leq \exp(\epsilon) \cdot \Pr[v+r=k]$.

Property 1 suggests that if the targeted statistic $f(x)$ has sensitivity $\Delta$, then adding geometric noise with magnitude proportional to $\Delta$ is sufficient to achieve differential privacy. As mentioned earlier, participants do not trust the aggregator or each other. Thus, the aggregator should not be trusted with the task of noise generation, since revealing the true statistic to the aggregator clearly violates differential privacy. Moreover, individual participants should not be trusted with this task either, since otherwise, this designated participant would be able to learn the true statistic as well.

To achieve DD-privacy for summation, let $x = (x_1, \ldots, x_n) \in D^n$ and $r = (r_1, \ldots, r_n) \in \Omega^n$ represent the data and noise values respectively from all participants in a certain time period. Thus, $D = O = Z_p$ (i.e., the cyclic group equipped with addition modulo p), and $\Omega = Z$. Also consider the aggregating function sum:$D^n \to O$, with $$\text{sum}(x) = \sum_{i=1}^{n} x_i p.$$

Moreover, each participant uses the same randomization function $\chi(x_i, r_i) := x_i + r_i p$.

For any two elements u, $v \in Z_p$, let $|u-v|$ be the smallest non-negative integer s such that $u = v + sp$ or $v = u + sp$. Moreover, when adding an integer to an element in $Z_p$, one can assume that addition is performed using modulo p.

Also assume that each participant's original data falls within the domain $\{0, 1, \ldots, \Delta\}$. Hence, the sensitivity of sum is $\Delta$ with respect to one participant's change. In other words, if a single participant changes data, the sum changes by at most $\Delta$. Recall from Property 1 that if a $$Geom\left(\exp\left(\frac{\epsilon}{\Delta}\right)\right)$$

noise is incorporated into the output, then $\epsilon$-differential privacy is achieved. In the present case, the participants jointly contribute noise to the final output statistic. The goal is to ensure that if at least γn participants are honest and uncompromised, then noise of a similar magnitude will accumulate. In this way, not only is differential privacy guaranteed, but also the accumulated noise is ensured to be bounded in the final output so that the error is small.

Thus, the encryption mechanism provided by embodiments of the present invention guarantees $(\epsilon, \delta)$-DD-privacy, and meanwhile ensures small error of roughly $$O\left(\frac{\Delta}{\epsilon}\sqrt{\frac{1}{\gamma}}\right)$$

magnitude. As long as a constant fraction γ of participants are honest, the error term is independent of n, the number of participants. The result is near optimal, given that an accumulated noise of magnitude $$\Theta\left(\frac{\Delta}{\varepsilon}\right)$$

is necessary to ensure differential privacy. Furthermore, considering the extreme case when $$\gamma = O\left(\frac{1}{n}\right)$$

(i.e., each participant believes that all other participants may be compromised, or only a constant number of them are honest), the accumulated noise would be $$O\left(\frac{\Delta}{\varepsilon}\sqrt{\frac{1}{\gamma}}\right) = O\left(\frac{\Delta}{\varepsilon}\sqrt{n}\right).$$

This also makes sense intuitively, since each participant must add a symmetric noise of magnitude $$\Theta\left(\frac{\Delta}{\varepsilon}\right)$$

in this case to ensure privacy. It therefore follows that the sum of n independent symmetric noises of magnitude $$\Theta\left(\frac{\Delta}{\varepsilon}\right)$$

results in a final noise of magnitude $$O\left(\frac{\Delta}{\varepsilon}\sqrt{n}\right)$$

with high probability.

Theorem 2 (DD-Private Procedure with Low Error):
Let $\varepsilon > 0$ and $0 < \delta < 1$. Suppose each participant's data comes from integers inside an interval of width $\Delta$ in $Z_p$, where $$\Delta \geq \frac{\varepsilon}{3}.$$

Also, suppose at least γ fraction of the n participants are uncompromised such that $$\gamma \geq \frac{1}{n}\log\frac{1}{\delta}.$$

Then, there exists a randomized procedure to generate $r = (r_1, \ldots, r_n)$ that is $(\varepsilon, \delta)$-DD-private with respect to sum. Moreover, for all $x \in (Z_p)^n$, for all $0 < \eta < 1$ such that $$\log\frac{2}{\eta} \leq \frac{1}{\gamma}\log\frac{1}{\delta},$$

with probability at least $1-\eta$ over the random choice of r, $$|\text{sum}(x) - \text{sum}(\hat{x})| \leq \frac{4\Delta}{\varepsilon}\sqrt{\frac{1}{\gamma}\log\frac{1}{\delta}\log\frac{2}{\eta}}, \text{ where}$$

$$\hat{x} := \hat{x}(r) := (x_1 + r_1, x_2 + r_2, \ldots, x_n + r_n)p.$$

Table 1 describes a procedure that achieves the guarantee in Theorem 2. Further analysis is provided below under Lemma 1 and Theorem 3. Specifically, Theorem 3 analyzes how much the noisy statistic sum($\hat{x}$) deviates from the true output sum (x). Since $\hat{x}$, it suffices to bound the magnitude of $$Z := \sum_{i=1}^{n} r_i.$$

TABLE 1

DD-Private Data Randomization Procedure

Let $\alpha := \exp\left(\frac{\varepsilon}{\Delta}\right)$ and $\beta := \frac{1}{\gamma n}\log\frac{1}{\delta} \leq 1$.

Let x = (x1, . . . xn) denote all participants' data in a certain time period.
foreach participant i ∈ [n] do
    Sample noise $r_i$ according to the following distribution:

$$r_i \leftarrow \begin{cases} \text{Geom}(\alpha) & \text{with probability } \beta \\ 0 & \text{with probability } 1 - \beta \end{cases}$$

Randomize data by computing $\hat{x}_i \leftarrow x_i + r_i \mod p$.

Lemma 1:
Let $\varepsilon > 0$ and $0 < \delta < 1$. Suppose at least γ fraction of participants are uncompromised. Then, the above randomization procedure achieves $(\varepsilon, \delta)$-DD-privacy with respect to sum, for $$\beta = \min\left\{\frac{1}{\gamma n}\log\frac{1}{\delta}, 1\right\}.$$

Theorem 3 (Bounding Error):
Let $\varepsilon > 0$ and $0 < \delta < 1$. Suppose each participant's data comes from integers inside an interval of width $\Delta$, where $$\Delta \geq \frac{\varepsilon}{3}.$$

Suppose at least $$\gamma \geq \frac{1}{n}\log\frac{1}{\delta}$$

fraction of the n participants are uncompromised. Suppose the randomized procedure in Table 1 is run to produce $r := (r_1, \ldots, r_n)$ with $$\alpha := \exp\left(\frac{\varepsilon}{\Delta}\right) \text{ and } \beta := \frac{1}{\gamma n}\log\frac{1}{\delta} \le 1.$$

Then, for all $0<\eta<1$ such that $$\log\frac{2}{\eta} \le \frac{1}{\gamma}\log\frac{1}{\delta},$$

with probability at least $1-\eta$:

$$\left|\sum_{i=1}^{n} r_i\right| \le 4\sqrt{\frac{1}{\gamma}\log\frac{1}{\delta}\log\frac{2}{\eta}} \cdot \frac{\sqrt{\alpha}}{\alpha-1} \le \frac{4\Delta}{\varepsilon}\sqrt{\frac{1}{\gamma}\log\frac{1}{\delta}\log\frac{2}{\eta}}.$$

According to Theorem 3, the accumulated error is bounded by $$O\left(\frac{\Delta}{\varepsilon}\sqrt{\frac{1}{\gamma}}\right)$$

with high probability. Suppose each participant's value is picked from the domain $\mathcal{D} = \{0, \ldots, \Delta\}$. Then, the aggregator simply has to try to decrypt the sum within the range $$\left[-O\left(\frac{\Delta}{\varepsilon}\sqrt{\frac{1}{\gamma}}\right), n\Delta + O\left(\frac{\Delta}{\varepsilon}\sqrt{\frac{1}{\gamma}}\right)\right]p,$$

where p is the size of the mathematical group in use. Decryption will succeed with high probability.

Theorem 3 is a measure concentration result, which is proven by analyzing the moment generating function of each $r_i$. Observe that as long as there is a constant fraction $\gamma$ of uncompromised participants, the error bound is independent of n. Because the variance of Geom($\alpha$) distribution is $$\frac{2\alpha}{(\alpha-1)^2},$$

with high probability the error is at most a constant factor worse than adding one copy of Geom($\alpha$) to the final answer, which is the minimal amount of noise required to ensure $\epsilon$-differential privacy.

Additional Embodiments

Evaluating Distributions:

Analysts often would like to study distributions over a population. In some embodiments, the PSA system can be extended to allow an aggregator to periodically evaluate the approximate distribution of n participants' data. For example, suppose that the distribution is known to be a Gaussian, then it suffices for each participant to encrypt the original value as well as its square. Using these encrypted values, the aggregator can recover the distribution through the mean and the variance (or second moment). For other distributions, the participants may need to encrypt higher moments as well. In general, the more moments each participant encrypts, the better the aggregator is able to estimate the distribution.

Public Access to a Statistic:

In some embodiments, the PSA system enables public access to an aggregated value (e.g., a sum of individual values), but not to the individual values. For example, the aggregator capability can be set to $sk_0=0$, thus making the aggregator's capability public. Also, the n participants receive values $sk_1, \ldots, sk_n$ that add up to zero. The n participants and any public aggregator perform encryption and decryption of aggregate statistics as usual. To obtain an aggregate sum, a discrete log must be computed, so again the plaintext space should be small.

Multiple-Level Hierarchies:

In some embodiments, the protocol for the PSA system can be nested in order to provide access control hierarchies, in which entities at higher levels have access to statistics pooled over all leaf nodes under them. In the setup phase, an entity at level j>1 is given the sum of the secrets of the entities at the level below. Also, if j=1 (i.e., only one nested level), each entity above the leaf nodes is given the negative of the sum of the secrets of the participants below it.

Product, Rather than Sum:

In some embodiments, the PSA mechanism supports oblivious computation of a product instead of a sum. To achieve this, a participant encrypts a data value $\chi$ as $c \leftarrow \chi \cdot H(t)^{sk_i}$. Because the plaintext is no longer in the exponent, this scheme for products does not require that the plaintext space be small.

Figure 5:
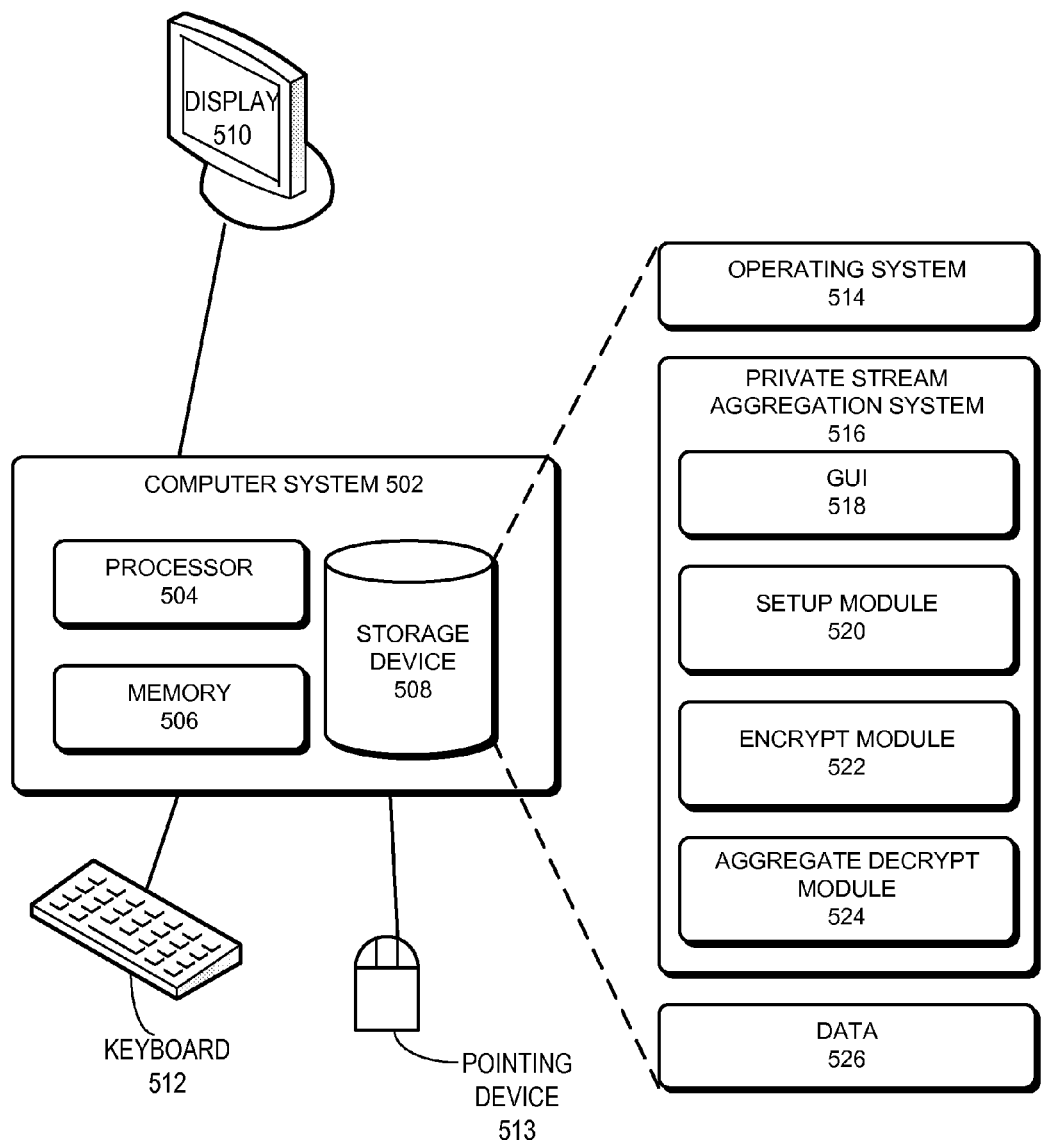
FIG. 5 illustrates a computer system that facilitates privacy-preserving data aggregation in accordance with an embodiment.

FIG. 5 illustrates a computer system that facilitates privacy-preserving data aggregation in accordance with an embodiment of the present invention. Computer system 502 includes a processor 504, a memory 506, and a storage device 508. Furthermore, computer system 502 can be coupled to a display device 510, a keyboard 512, and a pointing device 513. Storage device 508 can store operating system 514, applications 516, and data 526.

Applications 516 can include instructions, which when executed by computer system 502, can cause computer system 502 to perform methods and/or processes described in this disclosure. Specifically, applications 516 can include instructions for determining a private key (setup module 520), instructions for encrypting a plaintext value (encrypt module 522), and instructions for decrypting an aggregate value from a set of encrypted data values (aggregate decrypt module 524).

Data 526 can include any data that is required as input or that is generated as output by the methods and/or processes described in this disclosure. Specifically, data 526 can store at least a private key, plaintext data values, random noise values, encrypted data values, and an aggregate value.

Figure 6:
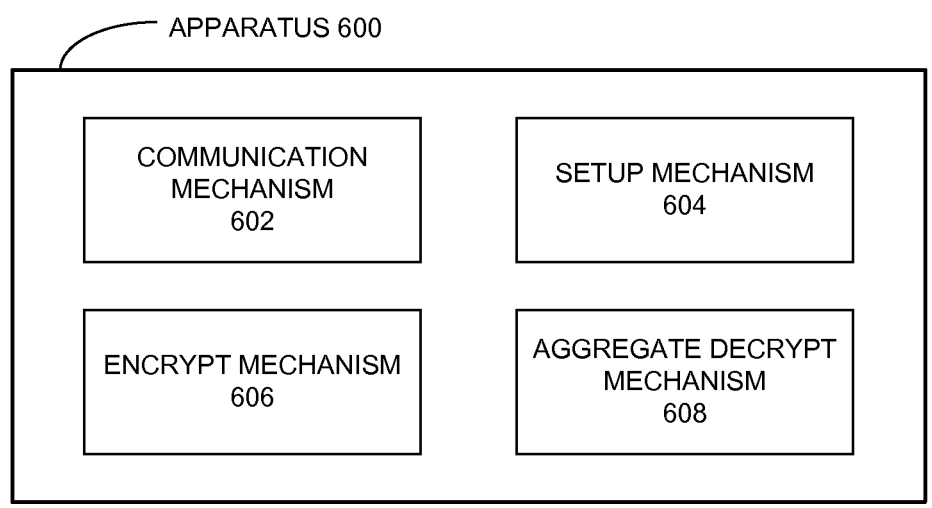
FIG. 6 illustrates an apparatus that facilitates privacy-preserving data aggregation in accordance with an embodiment.

FIG. 6 illustrates an apparatus that facilitates privacy-preserving data aggregation in accordance with an embodiment of the present invention. Apparatus 600 can comprise a plurality of mechanisms which may communicate with one another via a wired or wireless communication channel. Apparatus 600 may be realized using one or more integrated circuits, and apparatus 600 may include fewer or more mechanisms than those shown in FIG. 6. Further, apparatus 600 may be integrated in a computer system, or it may be realized as a separate device which is capable of communicating with other computer systems and/or devices. Specifically, apparatus 600 can comprise a communication mechanism 602, a setup mechanism 604, an encrypt mechanism 606, and an aggregate decrypt mechanism 608.

In some embodiments, communication mechanism 602 may be configured to send encrypted data values to a data aggregator, and/or to receive encrypted data values from a set of participants. Moreover, setup mechanism 604 may be configured to determine a private key, encrypt mechanism 606 may be configured to encrypt a plaintext value, and aggregate decrypt mechanism 608 may be configured to decrypt an aggregate value from a set of encrypted data values.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for sharing sensitive data with a data aggregator, the method comprising:
    determining a private key for a local user in a set of users, wherein the sum of the private keys associated with the set of users and the data aggregator is equal to zero;
    selecting, at a client computer, a set of data values associated with the local user;
    encrypting individual data values in the set based in part on the private key to produce a set of encrypted data values, thereby allowing the data aggregator to decrypt an aggregate value across the set of users without decrypting individual data values associated with the set of users, and without interacting with the set of users while decrypting the aggregate value; and
    sending the set of encrypted data values to the data aggregator;
    wherein the set of data values includes a time series, wherein the private key is determined prior to encrypting the individual data values in the time series, wherein the aggregate value includes a summation of the individual values associated with the set of users; and
    wherein encrypting an individual data value $x_{i,t}$ for a user i and time period t involves computing an expression:
    $$c_{i,t} = g^{x_{i,t}} \cdot H(t)^{sk_i}$$
    wherein $c_{i,t}$ is an encrypted value associated with user i and time period t, wherein g is a generator, wherein $sk_i$ is a private key associated with user i, and wherein $H(t)$ is a hash function.

2. The method of claim 1, wherein determining the private key for the local user comprises receiving the private key from a trusted source.

3. The method of claim 1, wherein determining the private key for the local user comprises using a secure multi-party protocol.

4. The method of claim 1, wherein encrypting the individual data values involves adding random values to at least a subset of the data values to produce a modified set of data values with random noise.

5. The method of claim 4, wherein the random values are chosen from a pre-determined distribution to minimize the total noise introduced to the aggregate value by the set of users to:
$$O\left(\frac{\Delta}{\varepsilon}\sqrt{n}\right),$$
    wherein $\Delta$ is the sensitivity of the aggregate value, and wherein n is the number of users.

6. The method of claim 1, wherein encrypting the individual data values involves also encrypting higher moments of the individual data values, thereby allowing the data aggregator to determine a distribution for the data values across the set of users.

7. A non-transitory computer-readable storage medium storing instructions that when executed by a computer cause the computer to perform a method for sharing sensitive data with a data aggregator, the method comprising:
    determining a private key for a local user in a set of users, wherein the sum of the private keys associated with the set of users and the data aggregator is equal to zero;
    selecting a set of data values associated with the local user;
    encrypting individual data values in the set based in part on the private key to produce a set of encrypted data values, thereby allowing the data aggregator to decrypt an aggregate value across the set of users without decrypting individual data values associated with the set of users, and without interacting with the set of users while decrypting the aggregate value; and
    sending the set of encrypted data values to the data aggregator;
    wherein the set of data values includes a time series, wherein the private key is determined prior to encrypting the individual data values in the time series, and wherein the aggregate value includes a product of the individual values associated with the set of users; and
    wherein encrypting an individual data value $x_{i,t}$ for a user i and time period t involves computing an expression:
    $$c_{i,t} = x_{i,t} \cdot H(t)^{sk_i}$$

wherein $c_{i,t}$ is the encrypted value associated with user i and time period t, wherein $sk_i$ is a private key associated with user i, and wherein H(t) is a hash function.

8. The computer-readable storage medium of claim 7, wherein determining the private key for the local user comprises receiving the private key from a trusted source.

9. The computer-readable storage medium of claim 7, wherein determining the private key for the local user comprises using a secure multi-party protocol.

10. The computer-readable storage medium of claim 7, wherein encrypting the individual data values involves adding random values to at least a subset of the data values to produce a modified set of data values with random noise.

11. An apparatus for sharing sensitive data with a data aggregator, the method comprising:
a setup mechanism configured to determine a private key for a local user in a set of users, wherein the sum of the private keys associated with the set of users and the data aggregator is equal to zero;
an encrypt mechanism configured to:
select a set of data values associated with the local user; and
encrypt individual data values in the set based in part on the private key to produce a set of encrypted data values, thereby allowing the data aggregator to decrypt an aggregate value across the set of users without decrypting individual data values associated with the set of users, and without interacting with the set of users while decrypting the aggregate value; and
a communication mechanism configured to send the set of encrypted data values to the data aggregator;
wherein the set of data values includes a time series, wherein the private key is determined prior to encrypting the individual data values in the time series, and wherein the aggregate value includes a summation of the individual values associated with the set of users; and
wherein while encrypting an individual data value $x_{i,t}$ for a user i and time period t, the encrypt mechanism is further configured to compute an expression:
$$c_{i,t}=g^{x_{i,t}} \cdot H(t)^{sk_i}$$
wherein $c_{i,t}$ is an encrypted value associated with user i and time period t, wherein g is a generator, wherein $sk_i$ is a private key associated with user i, and wherein H(t) is a hash function.

12. The apparatus of claim 11, wherein determining the private key for the local user comprises receiving the private key from a trusted source.

13. The apparatus of claim 11, wherein determining the private key for the local user comprises using a secure multi-party protocol.

14. The apparatus of claim 11, wherein encrypting the individual data values involves adding random values to at least a subset of the data values to produce a modified set of data values with random noise.

15. The computer-readable storage medium of claim 7, wherein the random values are chosen from a pre-determined distribution to minimize the total noise introduced to the aggregate value by the set of users to:

$$O\left(\frac{\Delta}{\varepsilon}\sqrt{n}\right),$$

wherein $\Delta$ is the sensitivity of the aggregate value, and wherein n is the number of users.

16. The computer-readable storage medium of claim 10, wherein encrypting the individual data values involves also encrypting higher moments of the individual data values, thereby allowing the data aggregator to determine a distribution for the data values across the set of users.

17. The apparatus of claim 11, wherein the random values are chosen from a pre-determined distribution to minimize the total noise introduced to the aggregate value by the set of users to:

$$O\left(\frac{\Delta}{\varepsilon}\sqrt{n}\right),$$

wherein $\Delta$ is the sensitivity of the aggregate value, and wherein n is the number of users.

18. The apparatus of claim 14, wherein while encrypting the individual data values, the encrypt mechanism is further configured to also encrypt higher moments of the individual data values, thereby allowing the data aggregator to determine a distribution for the data values across the set of users.

* * * * *